US010652292B1

(12) United States Patent
Saxton

(10) Patent No.: US 10,652,292 B1
(45) Date of Patent: May 12, 2020

(54) SYNCHRONIZATION OF MULTIPLE ENCODERS FOR STREAMING CONTENT

(71) Applicant: Amazon Technologies, Inc., Seattle, WA (US)

(72) Inventor: John Robert Saxton, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 151 days.

(21) Appl. No.: 15/195,853

(22) Filed: Jun. 28, 2016

(51) Int. Cl.
*H04L 29/06* (2006.01)
*H04L 12/26* (2006.01)
*H04L 7/00* (2006.01)

(52) U.S. Cl.
CPC ........ *H04L 65/4069* (2013.01); *H04L 7/0083* (2013.01); *H04L 43/106* (2013.01)

(58) Field of Classification Search
CPC .................................................. H04L 65/4069
USPC ........................................................ 709/219
See application file for complete search history.

(56) References Cited

U.S. PATENT DOCUMENTS

| 5,652,749 A * | 7/1997 | Davenport ......... H04N 21/2381 348/464 |
| 9,002,991 B2 * | 4/2015 | Fletcher ............. H04N 21/2221 709/219 |
| 9,900,577 B2 * | 2/2018 | Kim .................... H04N 13/0051 |
| 2002/0035732 A1 * | 3/2002 | Zetts .................... G11B 27/002 725/148 |
| 2004/0001591 A1 * | 1/2004 | Mani .................. H04N 21/4147 380/210 |
| 2005/0262537 A1 * | 11/2005 | Baran ............... H04L 29/06027 725/88 |
| 2006/0136768 A1 * | 6/2006 | Liu ....................... H04N 5/4401 713/400 |
| 2006/0282783 A1 * | 12/2006 | Covell .................... G06T 11/40 715/744 |

(Continued)

OTHER PUBLICATIONS

Correll et al., "Design Considerations for Software Only Implementations of the IEEE 1588 Precision Time Protocol", 2005 (Year: 2005).*

(Continued)

*Primary Examiner* — Ondrej C Vostal
(74) *Attorney, Agent, or Firm* — Knobbe, Martens, Olson & Bear, LLP

(57) ABSTRACT

Systems and methods are described to enable synchronized encoding of streaming audio or video content between multiple encoders, in a manner that provides for seamlessly interchangeable encodings. A first encoding begins encoding streaming content at a first point in time, and at a later point in time, a second encoder is configured to begin encoding the streaming content in a manner synchronized with the first encoder. The second encoder communicates via a synchronization protocol with the first encoder, and receives state information of the first encoder, such as a timecode of the streaming content at which the first encoder began encoding. The second encoder uses the received state information to determine a difference in encoding start times between the first and second encoder, and to adjust its timestamp values to match those of the first encoder. Thereafter, the first and second encoders can encode content in a synchronized manner.

20 Claims, 6 Drawing Sheets

(56) References Cited

U.S. PATENT DOCUMENTS

| | | | |
|---|---|---|---|
| 2006/0291798 A1* | 12/2006 | Suneya | G11B 27/034 386/232 |
| 2007/0109162 A1 | 5/2007 | Hwang | |
| 2007/0127720 A1* | 6/2007 | White | H04N 5/76 380/277 |
| 2010/0040349 A1* | 2/2010 | Landy | G11B 27/005 386/353 |
| 2010/0161825 A1* | 6/2010 | Ronca | H04N 21/23424 709/231 |
| 2010/0218227 A1* | 8/2010 | Frink | H04N 7/17327 725/93 |
| 2011/0096828 A1* | 4/2011 | Chen | H04N 21/23106 375/240.02 |
| 2011/0150099 A1* | 6/2011 | Owen | H04N 21/23406 375/240.26 |
| 2011/0235703 A1* | 9/2011 | Labrozzi | H04N 21/23424 375/240.02 |
| 2011/0276712 A1* | 11/2011 | Narula | H04L 65/4092 709/231 |
| 2012/0011550 A1* | 1/2012 | Holland | H04N 21/4126 725/78 |
| 2012/0042050 A1* | 2/2012 | Chen | H04L 65/604 709/219 |
| 2012/0128061 A1* | 5/2012 | Labrozzi | H04N 21/234354 375/240.02 |
| 2012/0179833 A1* | 7/2012 | Kenrick | H04N 21/234309 709/231 |
| 2012/0230389 A1* | 9/2012 | Laurent | H04N 21/235 375/240.01 |
| 2012/0246279 A1* | 9/2012 | Zang | H04L 65/4076 709/219 |
| 2014/0132837 A1* | 5/2014 | Ye | H04N 19/423 348/525 |
| 2014/0164636 A1* | 6/2014 | Silvestri | H04L 65/4076 709/231 |
| 2014/0304756 A1* | 10/2014 | Fletcher | H04N 21/2625 725/115 |
| 2015/0189225 A1* | 7/2015 | Soroushian | H04N 7/0127 348/459 |
| 2015/0221316 A1* | 8/2015 | Mufti | G06F 16/683 700/94 |
| 2015/0237094 A1* | 8/2015 | Einarsson | H04L 65/4084 709/203 |
| 2015/0281746 A1* | 10/2015 | Lam | H04N 21/2368 725/116 |
| 2015/0281752 A1* | 10/2015 | Van Veldhuisen | H04N 21/2368 725/116 |
| 2016/0057317 A1* | 2/2016 | Zhao | H04N 21/4627 348/515 |
| 2016/0063434 A1* | 3/2016 | Kim | G06Q 10/0833 705/333 |
| 2016/0134881 A1* | 5/2016 | Wang | H04N 19/436 375/240.02 |
| 2016/0134945 A1* | 5/2016 | Gower | H04N 21/234345 725/88 |
| 2016/0182973 A1* | 6/2016 | Winograd | H04N 21/262 725/25 |
| 2016/0286260 A1* | 9/2016 | Lawrence | H04N 21/4307 |
| 2016/0301957 A1 | 10/2016 | McCarthy et al. | |
| 2016/0337672 A1* | 11/2016 | Lee | H04N 21/236 |
| 2017/0048291 A1* | 2/2017 | Jacobsson | H04L 65/4076 |
| 2017/0048536 A1* | 2/2017 | Forehand | H04N 19/436 |
| 2017/0064342 A1* | 3/2017 | Botsford | H04N 21/23439 |
| 2017/0094329 A1* | 3/2017 | Fliam | G11B 27/10 |
| 2017/0103769 A1* | 4/2017 | Laaksonen | G10L 19/24 |
| 2017/0366833 A1* | 12/2017 | Amidei | H04L 65/602 |

OTHER PUBLICATIONS

Singer, "Associating Time-codes with RTP streams", 2008 (Year: 2008).*

SMPTE, "SMPTE Engineering Guideline", "Conversion of Time Values Between SMPTE 12M Time Code, MPEG-2 PCR Time Base and Absolute Time", EG 40/2002, 2002 (Year: 2002).*

Wikipedia, "Linear tinnecode", 2019 (Year: 2019).*

U.S. Appl. No. 15/194,347, Synchronization of Multiple Encoders for Streaming Content, filed Jun. 27, 2016.

U.S. Appl. No. 15/194,401, Controller to Synchronize Encoding of Streaming Content, filed Jun. 27, 2016.

* cited by examiner

SYNCHRONIZATION OF MULTIPLE ENCODERS FOR STREAMING CONTENT

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ interconnected computing devices (e.g., within data centers) to deliver content to users or clients. In some instances, these computing devices may support traditional content distribution systems, such as by creating, modifying or distributing streaming television or radio content. In other instances, these computing devices may serve to replicate or replace prior content distribution systems. For example, data centers can provide network-based streaming audio or video content in a manner similar to traditional television or radio networks. This content is sometimes referred to as "internet television" or "internet radio," respectively. The content provided by these distribution systems (e.g., both traditional and computing network-based) may be pre-recorded, or live. Often, where computing devices are used to facilitate either traditional or network-based distribution systems, specialized software is used to replace or replicate functionality of dedicated hardware devices. For example, software applications may be used to encode and package a data stream containing live video content, thus reducing or eliminating the need for dedicated hardware to perform these functions. Because of the flexibility of software-based solutions, a single computing device may be utilized to generate content for both traditional and network-based generation systems.

DETAILED DESCRIPTION

Figure 1:
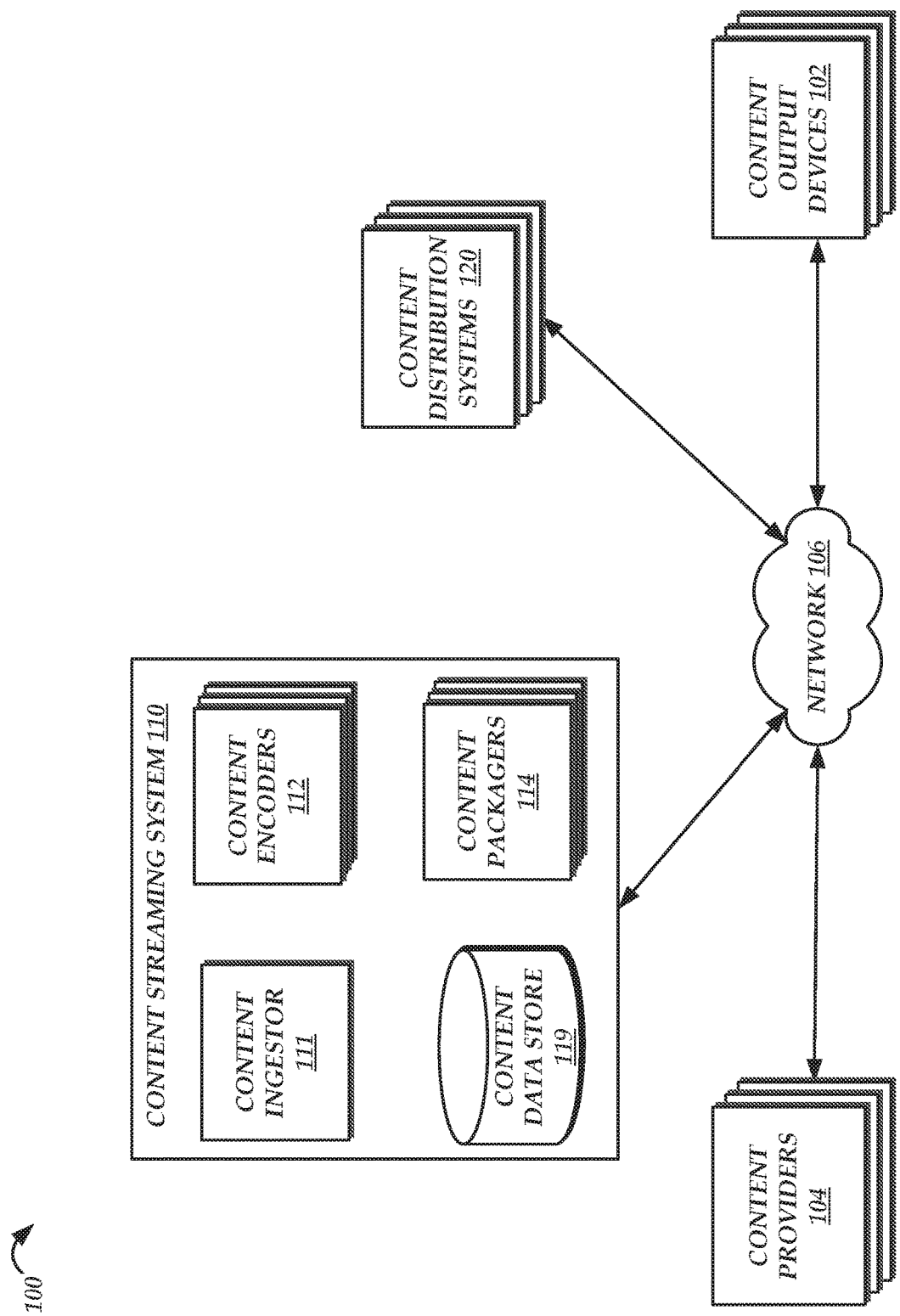
FIG. 1 is a block diagram depicting an illustrative logical network environment including content output devices, content providers, content distribution systems, and a content streaming system configured to provide encoded and packaged streaming content by use of multiple redundant or cooperative encoders having synchronized encoding states.

Generally described, the present disclosure relates to providing streaming content over a communication network, by utilizing multiple, redundant or cooperative content encoders sharing a common synchronization state. More specifically, the present disclosure relates to a streaming content system that includes multiple content encoders, which may utilize a synchronization protocol. The synchronization protocol allows for synchronization of encoding states and ensures that content output by the encoders is identical or fully interchangeable by a content packager.

Generally described, streaming content can include any content that is intended to be processed (e.g., ingested, encoded, packaged, etc.) and delivered in "real-time," such as television, radio, or network-based content streams. In one embodiment, streaming content is live content (e.g., being both recorded and presented in "real-time," which may include minor delays, such as to provide the ability for content censoring or filtering). While a single computing device might be used to process a content stream, any failure or delay by that computing device might cause a corresponding failure or delay in the content stream. Moreover, because of the "streaming" nature of that content, it may not be possible to recover a portion of the content that is lost due to delay or failure. For example, where a computing device processing a content stream fails and must reboot, the portion of the content stream (e.g., stemming from a live recording) may simply be lost to end viewers.

In the instance that a single device fails, other devices can continue to process the content stream, with the intention that end users experience an uninterrupted stream. However, despite concurrent processing of content, redundant devices may not be fully interchangeable, such that transitioning an end user between streams provided by the redundant devices does not result in a "seamless" transition. Specifically, the content output by any processing device may be dependent at least in part on the state of that device, such as a current "timestamp" for content processed by the device. Thus, in order to enable redundant content processing in a manner that allows for seamless transition between redundant output streams, the present disclosure provides for synchronizing the state of content processing devices, such as content encoders. Specifically, the present disclosure provides a protocol by which a content processing device can communicate with other content processing devices, to determine the state of those devices, and to synchronize its own state with that of the other devices. Thereafter, the content processing device can being processing content according to the synchronized state, such that an output content stream is interchangeable with the content streams provided by other devices.

In accordance with aspects of the present disclosure, described herein is a content streaming system that includes a content ingestor to receive streaming content (e.g., from a live content source), multiple content encoders configured to encode that streaming content, and a content packager configured to package the encoded content (received from the content encoders) and provide the packaged content to content output devices, such as such as computing devices, televisions, or radios, to content distribution systems, such as network-based systems, television networks, or radio networks, or both. As described in more detail below, individual content encoders can function to synchronize their encoding such that the segmentation of content output by two encoders, as well as the timestamp values reflected in that output content, are synchronized. Specifically, on initializing a second encoder, the second encoder can implement a synchronization protocol that enables the encoder to receive state information from another reference encoder. The state information may reflect any information regarding the functioning of the reference encoder, such as a timecode at which the reference encoder began encoding a content or the configuration parameters of the encoder. As used herein, timecode generally refers to a time value encoded into a content stream. Thereafter, the second encoder can utilize the state information to synchronize its own encoding with that of the reference encoder.

Synchronization of encoding may require, for example, synchronization of segmentation boundaries within encoded content. As described in detail below, segmentation boundaries generally refer to boundaries between time-based logical divisions of encoded content. For example, with respect to video content, segmentation boundaries may designate the transition between a first "group of pictures" and a second "group of pictures," with each group of pictures representing a collection of video frames that are collectively encoded. With respect to audio, segmentation boundaries may designate a transition between audio "segments," which hold collections of audio "frames," which in turn hold collections of audio samples (generally the lowest-level representation of audio within digital content).

Additionally or alternatively, synchronization of encoding may require synchronization of timestamp values within encoded content. Timestamp generally refers to a time value encoded into a content stream, which may be used to facilitate decoding or presentation of the content. Timestamp values may have a relatively high resolution (e.g., 10 million values per second), and thus facilitate highly accurate playback. However, unlike timecode values (which are generally encoded into content by a recording device), timestamp values are often determined independently at an encoder. Because these timestamp values can be utilized by downstream devices (e.g., a content packager or a content output device), differences in timestamp values can result in erroneous, uneven, or unsynchronized packaging or playback. Thus, to enable seamless transition between encoded content streams at a content package, each content encoder may be required to maintain synchronized timestamp values. Accordingly, the content encoders disclosed herein can be configured to utilize a synchronization protocol that, on initialization of an encoder, enables the encoders to receive state information from a reference encoder (e.g., that has previously operated to encode content), and utilize the state information to synchronize its own state, including its own timestamp. The content encoder can then begin encoding in a synchronized manner. In this manner, the content encoders can provide truly interchangeable content streams to a content packager, thus providing redundancy and resiliency in the content streaming system.

In some instances, an encoder may utilize or encode within content more than one timestamp value. For example, where an encoder utilizes specific encoding styles, it may be necessary for a later decoder to decode content in a different order than that content is presented (e.g., such that frames of video are decoded "out of order"). Accordingly, the encoder may provide both a "presentation" timestamp, reflecting a time at which a given portion of content should be output, and a "decoding" timestamp, reflecting a time at which the portion should be decoded. The systems and methods described herein may be utilized to synchronize either or both of such types of timestamp. For example, where encoded content is intended for inclusion in streaming content formatted according to the MICROSOFT™ Internet Information Services (IIS) Smooth Stream protocol, timestamps may refer to "fragment absolute time" values within the encoded content.

While examples are provided herein with respect to redundant content encoders, embodiments of the present disclosure may be also implemented with respect to cooperative content encoders, such as content encoders that provider interchangeable, but not identical, content streams. For example, aspects of the present disclosure may enable synchronization of a first content encoder that operates to encode content into a first format (e.g., standard definition, or "SD") and a second content encoder that operates to encode content into a second format (e.g., high definition, or "HD"). Thus, content packagers, output devices, or distribution systems may be enabled to interchangeably utilize either format of content stream without interruption. Advantageously, the use of multiple encoders to encode content into different and interchangeable formats can allow greater variety of available formats than would be possible to encode on a single encoder, or may reduce the computing resources needed to individual encoders (e.g., enabling the use of lower cost, commodity grade hardware to encode content rather than more expensive, specialized hardware).

As will be appreciated by one of skill in the art in light of the present disclosure, the embodiments disclosed herein improves the ability of computing systems, such as content streaming systems, to deliver content to users in a resilient and/or cooperative manner. Specifically, aspects of the present disclosure improve the ability of content streaming systems to utilize redundant or cooperative encoding devices while allowing for seamless transition between the outputs of such devices. Moreover, the presently disclosed embodiments address technical problems inherent within computing systems; specifically, the unreliability of non-redundant systems, the limited ability of a single device to encode content according to a variety of formats or parameters, the inherently unsynchronized nature of multiple systems, and the difficulty in establishing synchronization in such systems (particularly in the context of live streams). These technical problems are addressed by the various technical solutions described herein, including the use of content encoders that can achieve synchronization according to a synchronization protocol, and that can utilize the synchronization protocol to establish synchronized encoder states and generate identical or interchangeable encoded content. Thus, the present disclosure represents an improvement on existing content streaming systems and computing systems in general.

The foregoing aspects and many of the attendant advantages of the present disclosure will become more readily appreciated as the same become better understood by reference to the following, when taken in conjunction with the accompanying drawings.

FIG. 1 is a block diagram depicting an illustrative logical network environment 100 including multiple content output devices 102, content providers 104, and content distribution systems 120 in communication with a streaming content delivery system 110 via a network 106. While the content output devices 102, the content providers 104, and the content distribution systems 120 are shown as grouped within FIG. 1, the content output devices 102, content providers 104, and content distribution systems 120 may be geographically distant, and independently owned or operated. For example, the content output devices 102 could represent a multitude of devices in various global, continental, or regional locations accessing the content streaming system 110. Further, the content providers 104 could represent a multitude of related or distinct parties that have associated with the content streaming system 110 to provide streaming content to the content output devices 102. Still further, the content distribution systems 120 could represent a multitude of related or distinct parties enabling distribution of content from the content streaming system 110 to the content output devices 102. While shown as distinct, any one or more of the content streaming system 110, content output devices 102, content providers 104, or content distribution systems 120 may be operated by a common entity, or by a common computing device. Accordingly, the groupings of content output devices 102, content providers 104, content streaming system 110, and content distribution systems 120 within FIG. 1 is intended to represent a logical, rather than physical, grouping. Similarly, each of the components of the content streaming system 110 may be located within geographically diverse areas.

Network 106 may be any wired network, wireless network, or combination thereof. In some instances, network 106 may be a telecommunications network, such as a personal area network, local area network, wide area network, cable network, satellite network, cellular telephone network, or combination thereof operating via the internet protocol (IP). In other instances, the network 106 may be or may include other network types, such as television networks or radio networks. In the example environment of FIG. 1, network 106 is a global area network (GAN), such as the Internet. Protocols and components for communicating via the other aforementioned types of networks are well known to those skilled in the art of electronic communications and thus, need not be described in more detail herein. While each of the content output devices 102, content providers 104, content distribution systems 120, and content streaming system 110 is depicted as having a single connection to the network 106, individual components of the content output devices 102, content providers 104, content distribution systems 120, and content streaming system 110 may be connected to the network 106 at disparate points. Accordingly, communication times and capabilities may vary between the components of FIG. 1. While shown in FIG. 1 as a single network, the network 106 may represent different networks interconnecting the different components of FIG. 1. For example, the network 106 may represent a first network (e.g., the Internet) that interconnects the content streaming system 110 and the content distribution systems 120, and a second network (e.g., a television broadcasting network) that interconnects the content distribution system 120 and the content output devices 102.

Content output devices 102 may include any number of different devices configured to output content from the content streaming system 100 (e.g., directly or via the content distribution systems 120). For example, individual content output devices 102 may correspond to computing devices, such as a laptop or tablet computer, personal computer, wearable computer, server, personal digital assistant (PDA), hybrid PDA/mobile phone, mobile phone, electronic book reader, set-top box, camera, digital media player, and the like. As a further example, individual content output devices 102 may correspond to televisions, radios, or other output devices (e.g., which may or may not include or correspond to computing devices). Each content output device 102 may include hardware and/or software enabling the reception and output of streaming content, including dedicated playback hardware, dedicated software (e.g., specially programmed applications), and general purpose software (e.g., web browsers) capable of outputting streaming content (e.g., by downloading the content directly, downloading a web page including the content, etc.).

Content providers 104 may include any computing device owned or operated by an entity that provides content to the content streaming system 110 for subsequent transmission to content output devices 102. For example, content providers 104 may include servers hosting streaming audio or video, or may include recording devices transmitting content to the content streaming system 110 (e.g., digital video recorders).

Content distribution systems 120 can include any computing device owned or operated by an entity that assists in delivery of content from the content streaming system 110 to the content output devices 102. Illustratively, the content distribution systems 120 may include network-based content delivery networks ("CDNs") that provide a geographically-diverse set of points of presence ("POPs") from which content output devices 102 may obtain and output content. As a further illustration, the content distribution systems 120 may include distribution points in traditional networks, such as a television station, cable provider station, radio station, etc.

The content streaming system 110 can include a variety of components and devices configured to process streaming content obtained from a content provider and make processed content available to the content output devices 102 and/or the content distribution systems 120. Specifically, the content streaming system 110 can include a content ingestor 111 configured to obtain a stream of content (e.g., live content) from a content provider 104, and to provide that content to the content encoders 112 for encoding. The content provided to the content ingestor 111 may be in "raw," uncompressed or analog format, or in a format that is otherwise required to be "encoded" prior to delivery to the content output devices 102. Accordingly, the content ingestor 111 may pass the stream of content onto one or more content encoders 112, which can encode the content into one or more formats accepted by the content distribution systems 120 or the content output devices 102. While the term "encode" is used herein to discuss the processing of the content encoders 112, use of this term is not intended to limit that processing to conversion of analog to digital formats. Rather, the content encoders 112 may in some instances process digital content to convert that digital content into another digital format (sometimes referred to as "transcoding"), and the term "encode" is intended to encompass to such conversions. As discussed above, in order to provide redundant or cooperative encoding of content (e.g., to provide resiliency or adaptive-quality streaming), multiple content encoders 112 may be configured to encode the stream of content received from the content ingestor 111 according to the same or to interchangeable parameters.

In accordance with the present disclosure, to ensure the interchangeability of content output by the content encoders 112, a content encoder 112 may be configured, before or on beginning to encode a content stream, to obtain state information regarding the state of another content encoder 112 also encoding the content stream, and to utilize the state information to initialize a state of the content encoder 112 to match or align with that of the other content encoder 112, thus providing interchangeable outputs.

After encoding the content, each content encoder 112 may provide the encoded content to one or more content packagers 114, which may package the content into a container format accepted by the content distribution systems 120 and/or content output devices 102. The content packagers 114 can then distribute the content to the content distribution systems 120, which may in turn distribute the content to content output devices 102 for decoding and output (e.g., display). Additionally or alternatively, the content streaming system 110 may distribute the content directly to the content output devices 102. The content streaming system 110 may further store the encoded content within the content data store 119 (e.g., for archival purposes, for later transmission to the content distribution systems 120 and/or content output devices 102). The content data store 119 may correspond to any persistent or substantially persistent data storage, such as a hard drive (HDD), a solid state drive (SDD), network attached storage (NAS), a tape drive, or any combination thereof.

Figure 2:
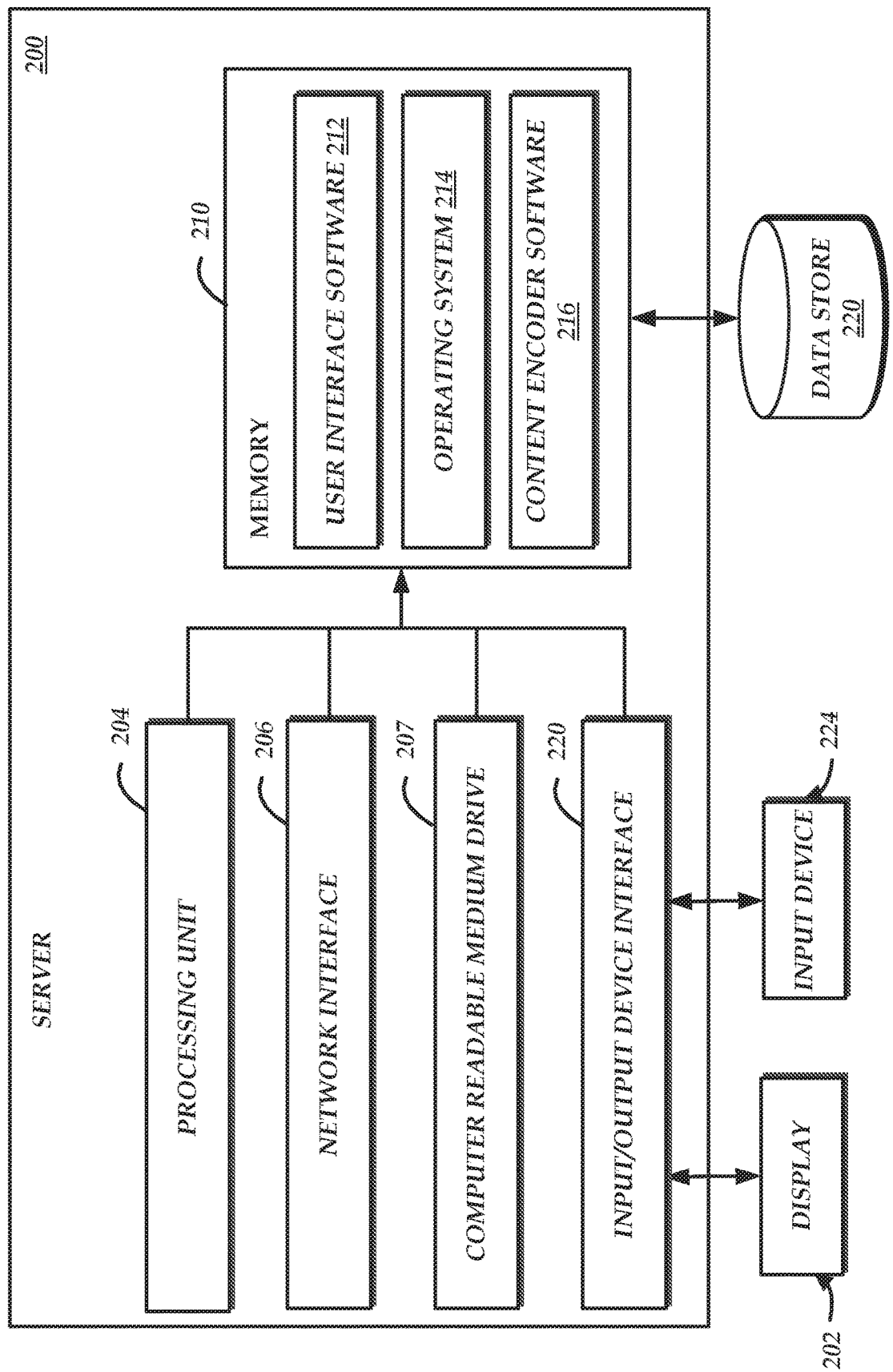
FIG. 2 is a block diagram depicting an illustrative configuration of one embodiment of a server than may implement a content encoder within the content streaming system of FIG. 1, and that may operate to synchronize its encoding state with the state of other content encoders.

It will be appreciated by those skilled in the art that the content streaming system 110 may have fewer or greater components than are illustrated in FIG. 1. In addition, the content streaming system 110 could include various web services or peer-to-peer network configurations. Thus, the depiction of the content streaming system 110 in FIG. 1 should be taken as illustrative. In some embodiments, components of the content streaming system 110, such as the content ingestor 111, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment. In other embodiments, components of the content streaming system 110, such as the content ingestor 111, may be implemented within an environment of a content provider 104 (e.g., on the premises of a content provider 104). Thus, the configuration shown within FIG. 1 is intended to be illustrative, and not limiting FIG. 2 depicts one embodiment of an architecture of a server 200 that may implement one or more of the content encoders 112 described herein. The general architecture of server 200 depicted in FIG. 2 includes an arrangement of computer hardware and software components that may be used to implement aspects of the present disclosure. As illustrated, the server 200 includes a processing unit 204, a network interface 206, a computer readable medium drive 207, an input/output device interface 220, a display 202, and an input device 224, all of which may communicate with one another by way of a communication bus. The network interface 206 may provide connectivity to one or more networks or computing systems, such as the network 106 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the server 200 may include more (or fewer) components than those shown in FIG. 2. For example, some embodiments of the server 200 may omit the display 202 and input device 224, while providing input/ output capabilities through one or more alternative communication channel (e.g., via the network interface 206).

The memory 210 may include computer program instructions that the processing unit 204 executes in order to implement one or more embodiments. The memory 210 generally includes RAM, ROM and/or other persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. In addition, memory 210 may include or communicate with one or more auxiliary data stores, such as data store 120, which may correspond to any persistent or substantially persistent data storage, such as a hard drive (HDD), a solid state drive (SDD), network attached storage (NAS), a tape drive, or any combination thereof.

In addition to the user interface module 212, the memory 210 may include content encoder software 216 that may be executed by the processing unit 204. In one embodiment, the content encoder software 216 implements various aspects of the present disclosure, e.g., encoding content obtained from a content ingestor 111, while utilizing a synchronization protocol to ensure synchronization with other content encoders 112 While the content encoder software 216 is shown in FIG. 2 as part of the server 200, in other embodiments, all or a portion of the software may be implemented by alternative computing devices within the content streaming system 110, such as virtual computing devices within a hosted computing environment.

Figure 3A:
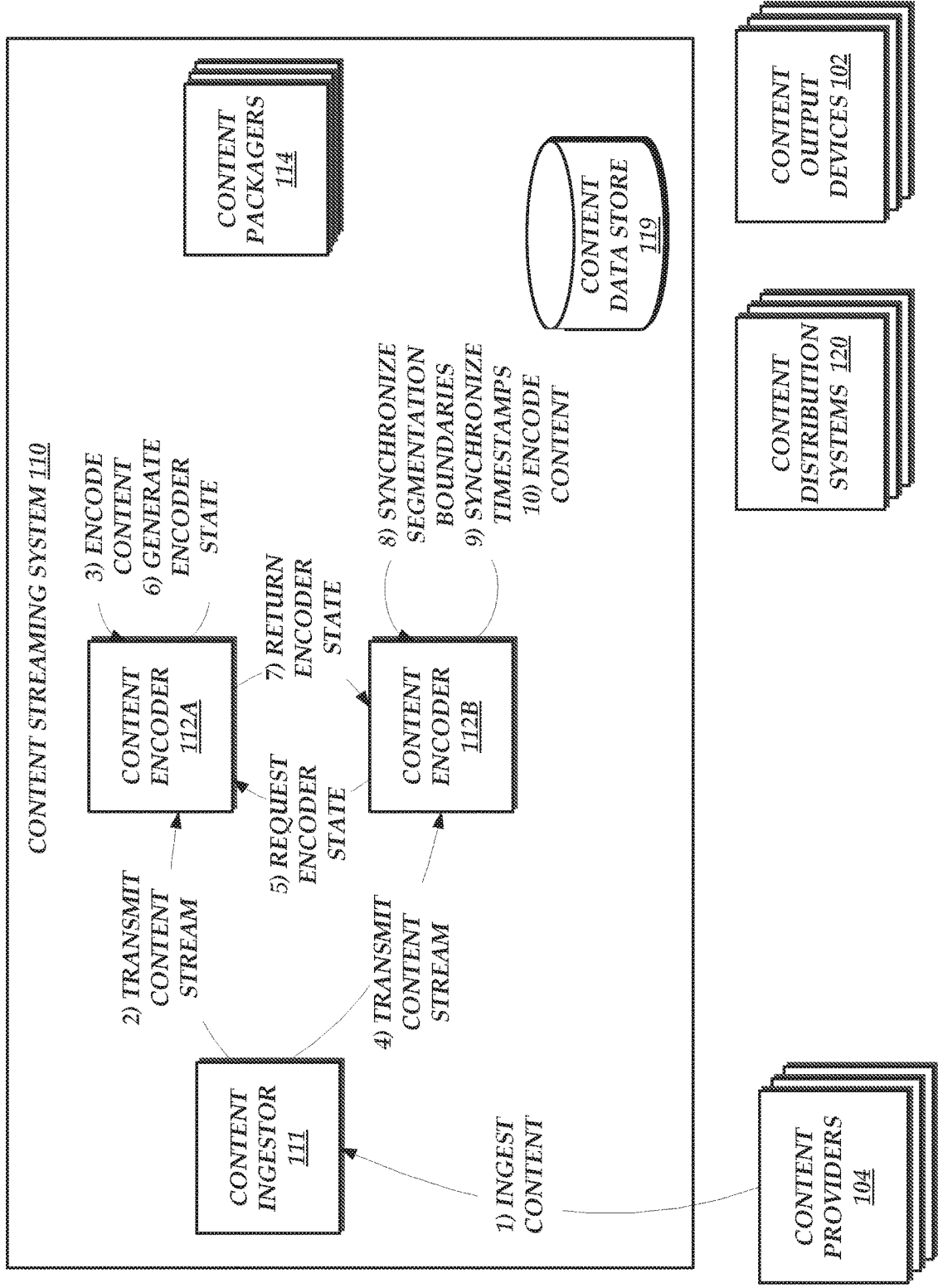
FIGS. 3A and 3B are block diagrams depicting illustrative interactions of the content streaming system of FIG. 1 to provide encoded and packaged streaming content by use of multiple redundant or cooperative encoders.
Figure 3B:
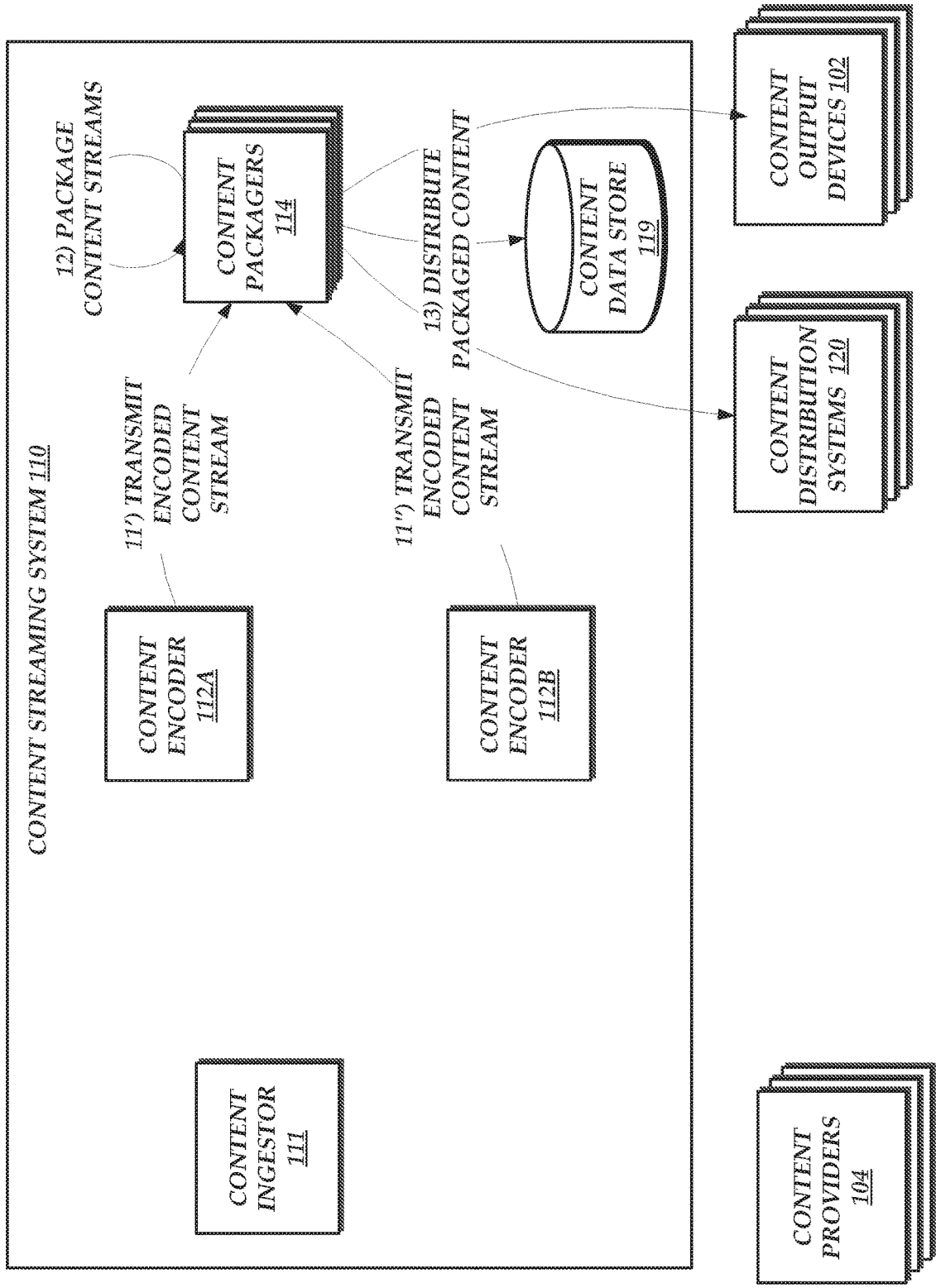

With reference to FIGS. 3A and 3B, a set of illustrative interactions for synchronized encoding of streaming content will be described. For the purposes of FIGS. 3A and 3B, a scenario will be described in which the content encoder 112A begins to encode content at a first point in time, and at a later point in time, the content encoder 112B begins to encode the content. Illustratively, the content encoder 112B may be configured to begin encoding to provide resiliency or redundancy within the content streaming system 110. Accordingly, it is desirable within the content streaming system 110 for the content output from the content encoders 112B to be identical or interchangeable with that output by encoder 112A. However, at least some aspects of content output by the encoders 112A and 112B may be dependent on the state of those respective encoders. For example, encoded video content often uses "groups of pictures" ("GOP") to encode video. Each group of pictures can consist of at least one "independent frame," and one or more "dependent frames." Each independent frame may be coded without respect to other frames of the video, such that decoding the independent frame does not depend on other frames within the video. Each dependent frame may be encoded based at least partly on other (e.g., previous) frames, such that decoding the dependent frame requires information of the other frames. Generally, the arrangement of groups of pictures within encoded content (and thus the arrangement of independent or dependent frames) is determined by the encoder, independent of the content being input. If encoders 112A and 112B begin encoding the received content stream simultaneously, the placement of groups of pictures within the output content stream can be expected to be the same, and thus, the content streams will be interchangeable. However, if encoders 112A and 112B begin encoding the received content stream at different times (e.g., due to latencies, due to a failure of one encoder that requires a reboot, etc.), the groups of pictures may vary. This may result in non-interchangeable content streams, since arrangement of independent or dependent frames varies between the streams. In addition to GOP arrangement, timestamp values of an encoder may be based on a state of the encoder. For example, an encoder may be configured with a "base" timestamp of 0, such that timestamps within content output by the encoder begin at 0 and increment proportionally to timecodes within the content (e.g., at a proportion of 10 million timestamps for every one second of content). The timestamps within a content may be utilized by a content packager 114 to determine which content to include within packaged content. For example, where two segments of video data with the same timestamp value are obtained by a content packager 114, the content packager 114 may assume that the segments contain the same video content. Thus, it is desirable for each content encoder 112 to maintain identical timestamp values for encoded content, even when the encoders 112 begin encoding at different times.

The interactions of FIG. 3A begin at (1), where the content ingestor 111 receives content from a content provider 104. Illustratively, the content ingestor 111 may receive content from content providers 104 over the network 106. In other embodiments, the content ingest 112 may receive content directly from a capture device (e.g., a digital video recorder connected to the content ingestor 111 via a serial digital interface ("SDI")). As noted above, the content provided to the content ingestor 111 may be in "raw," uncompressed or analog format, or in a format that is otherwise required to be "encoded" prior to delivery to the content output devices 102. Thus, at (2), the content ingestor 111 passes the content as a stream to encoder 112A, which begins encoding content at (3). Illustratively, the encoder 112A may encode the obtained content into any number of known formats, including but not limited to H.263, H.264, H.265, MICROSOFT SMPTE 421M (also known as VC-1), APPLE™ ProRes, APPLE Intermediate Codec, VP3 through 9, MPEG-2 part 2, RealVideo, Dirac, Theora, and MPEG-4 Part 2 (for video), and Vorbis, Opus, MP3, advanced audio coding ("AAC"), pulse-code modulation ("PCM"), dedicated to sound ("DTS"), MPEG-1, audio coding 3 ("AC-3"), free lossless audio codec ("FLAC"), and RealAudio (for audio), or combinations thereof. Various techniques for encoding content are known within the art, and therefore will not be described in greater detail herein.

Subsequently, the content streaming system 110 may be configured to begin encoding on a second encoder, content encoder 112B. Thus, at (4), the content ingestor 111 transmits the content stream to encoder 112B. Because of the streaming nature of the content stream, the content stream passed to each content encoder 112 is substantially identical, and synchronized in time. Accordingly, because content encoder 112B began at a later point in time than content encoder 112A, content encoder 112B has necessarily "lost" some portion of the content stream that was previously transmitted to content encoder 112A, and will begin encoding a later part of the content stream (simultaneously delivered to content encoder 112A). However, before beginning encoding, the content encoder 112B can undertake operations to ensure that the encoded content output by the encoder 112B is identical or interchangeable with that output by content encoder 112A. Specifically, the content encoder 112B can determine segmentation boundaries used by content encoder 112A (e.g., GOP alignment and audio segmentation alignment), as well as base timestamp and audio sample count values used by content encoder 112A.

Accordingly, at (5), the content encoder 112B can request encoder state information from the content encoder 112A. The encoder state information can include any information required by the synchronization processes of the content encoder 112B, as described below. In one embodiment, the encoder state information can include a timecode value indicating the timecode of the input content stream at which content encoder 112A began encoding the content stream. As will be described below, the content encoder 112B can be configured to utilize this timecode value to synchronize segmentation boundaries, timestamp values, and sample count values with the content encoder 112A. In some instances, the encoder state information may include other information regarding the content encoder 112A, such as configuration parameters of the content encoder 112A. In other instances, both content encoders 112 can be configured with the same parameters, and thus configuration parameters may be excluded from the encoder state information.

At (6), the content encoder 112A generates the requested encoder state information, and, at (7), the content encoder 112A returns the requested encoder state information to the content encoder 112B.

At (8), the content encoder 112B utilizes the received encoder state information to determine segmentation boundaries for the content. With respect to video, segmentation boundaries can designate the alignment of GOPs within a video stream. The size of each GOP is generally dependent on the configuration of an encoder. Because output of identical or interchangeable content can be dependent on use of the same segmentation boundaries, it would often be undesirable to begin a GOP at the first video frame seen by the content encoder 112B, as that frame is unlikely to be the first frame of a GOP created by the encoder 112A. However, by utilizing the timecode value received from the content encoder 112A (e.g., within the encoder state information), the content encoder 112B can calculate the timecode at which a next GOP will begin within the content encoder 112A. Illustratively, the content encoder 112B may calculate, for any given timecode value, a next video frame at which to begin a GOP according to the equation:

$$NextGOPFrame = Timecode_n + GOPSize - ((Timecode_n - Timecode_i) \bmod GOPSize)$$

where:

NextGOPFrame represents the next timecode at which a GOP would begin;

$Timecode_n$ represents any timecode within a video (e.g., the current timecode);

$Timecode_i$ represents a timecode at which a GOP is known to have begun (e.g., the initial timecode at which encoder 112A began encoding); and GOPSize represents the number of frames within a GOP. Note that this equation assumes that $Timecode_n$ is not equal to a timecode at which a GOP would begin. In the instance that $Timecode_n$ represents a timecode at which a GOP would begin (e.g., ($Timecode_n - Timecode_i$) mod GOPSize=0), then NextGOPFrame equals $Timecode_n$. Further, this equation assumes that the operations, such as addition, occur with appropriate conversions between different units, such as timecodes and frames, based on relationships between those units (e.g., 30 frames per second).

The content encoder 112B may additionally determine segmentation boundaries for audio content. Audio may generally be represented as samples over time (e.g., 48000 samples per second, or a sampling rate of 48 kilohertz ["KHz"]). Audio samples can be grouped together within content according to "frames." For example, in the AAC format, frames contain 1024 samples (e.g., at a sample rate of 48 KHz, there would be a frame rate of 46.875 frames of audio per second). These frames are further grouped into audio segments. In some instances, the length of an audio segment is static (e.g., occurring every n seconds). In other instances, the length of an audio segment is dynamic (e.g., occurring once per video GOP, with variance to enable a segment to contain only complete frames). In either instance, the sample count associated with the first audio sample output by the content encoder 112B can be calculated as:

elapsed samples=time encoded*sample rate where:
elapsed samples is the number of samples elapsed at the encoder 112A, which can be utilized as an initial sample count by the encoder 112B;
time encoded is the amount of content encoded by the encoder 112A (e.g., as indicated by a current timestamp, current timecode, a number of elapsed frames, etc.);
sample rate is the number of samples per time unit (e.g., second) in the content stream. Note that an implication of using static length audio segments is that the first audio segment emitted by encoder 112B may be shorter than subsequent audio segments (e.g., because the encoder 112B begins encoding in the middle of an audio segment emitted by encoder 112A). Similarly, where video segmentation is used and the content stream duration is not evenly divisible by the video segmentation length, use of segmented encoding may result in at least one segment, such as the final segment, that is shorter than an expected length. In some instances, shorter than expected segments can disrupt functionality of a packager 114 or output device 102, and the encoders 112 may be configured to either not create or not transmit shorter than expected segments.

In the instance that fixed audio segments are utilized, an encoder 112 can determine locations within the stream that correspond to each segment by calculating the number of samples within a segment (e.g., by multiplying the number of samples in a frame by the number of frames within a segment), and beginning a new segment at each interval of that value (e.g., such that if a current sample count modulo the number of samples in a segment equals zero, the sample begins a new segment). In the instance that dynamic audio segments are utilized by the encoders 112 (e.g., such that audio segments start at the first complete frame after a video segmentation boundary), an encoder 112 can determine locations within the stream that correspond to each segment by calculating the number of samples within a frame (e.g., 1024), and beginning a new segment at the first complete frame following the beginning of a video segment (e.g., such that if a current sample count modulo the number of samples in a frame equals zero, the sample begins a new segment). At (9), the content encoder 112 can synchronize timestamps with the content encoder 112A. Generally, timestamps begin at a base value (e.g., zero), and increment at a set rate (e.g., 10 million increments per second, or 10 megahertz ("MHz")). Accordingly, by knowledge of a timecode at when the reference encoder, encoder 112A, began encoding and the base value of that reference encoder, the secondary encoder 112B can calculate an expected timestamp for any given portion of the content. Specifically, the encoder 112B can determine a number of frames that will elapse between the timecode at which the encoder 112A began encoding and a timecode at which encoder 112B will begin encoding (e.g., by subtracting the timecode of the first frame encoded by encoder 112A from the timecode of the first frame encoded by encoder 112B), and use the resulting value (e.g., the prior frames encoded by encoder 112A) to calculate timestamps for each frame encoded by encoder 112B. For example, where the encoder 112B calculates each timestamp by reference to the number of frames elapsed, the timestamp for any given frame could be calculated as:

$$timestamp = \frac{RefEncFrames + EncFrames}{FPS} * timestamp\_resolution$$

where:
RefEncFrames represents the frames elapsed at a reference encoder (e.g., encoder 112A);
EncFrames represents the frames elapsed at the encoder currently encoding (e.g., encoder 112B);
FPS represents the frames per second of the video; and
timestamp_resolution represents the number timestamps to elapse per second.
Similarly, the timestamp for any given audio sample could be calculated as:

$$timestamp = \frac{RefEncSamples + EncSamples}{SampleRate} * timestamp\_resolution$$

where:
RefEncSamples represents the audio samples elapsed at a reference encoder (e.g., encoder 112A);
EncSamples represents the audio samples elapsed at the encoder currently encoding (e.g., encoder 112B);
SampleRate represents the samples per second of the audio; and
timestamp_resolution represents the number timestamps to elapse per second.
Additionally, the encoder 112B may synchronize its audio sample count value to that of the encoder 112A. Specifically, the encoder 112B can calculate how many audio frames will have elapsed between a point in time at which the encoder 112A began encoding, and a point in time at which the encoder 112B will begin encoding, and initialize its sample count based on that value. The number of audio frames elapsed for any given duration of time may be calculated as the duration of time multiplied by the frames per second (e.g., at 48 KHz and 1024 samples per frame, 46.875 frames per second). The sample count for encoder 112B can then be initialized as the number of audio frames elapsed multiplied by the samples per frame.

Thereafter, at (10), the content encoder 112B can begin encoding content, utilizing the synchronized segmentation boundaries, timestamp value, and audio sample count. Accordingly, the content output by the content encoder 112B will be identical or interchangeable with the content output by the content encoder 112A.

The above-discussed interactions continue in FIG. 3B, where both the content encoder 112A and 112B transmit the encoded content to the content packagers 114. The content packagers 114 may package the content into a container format accepted by the content distribution systems 120 and/or content output devices 102. As will be recognized by one of skill in the art, a container format may generally combine encoded audio and video into a file, potentially along with synchronization information for the audio and video, subtitles, metadata, or other information. Examples of containers include, but are not limited to, Matroska, FLV, MPEG-4 Part 12, VOB, Ogg, Audio Video Interleave ("AVI"), Quicktime, Advanced Systems Format ("ASF"), RealMedia, and MPEG Transport Stream ("MPEG-TS"). In some instances, containers may include exclusively audio or exclusively video, rather than a combination of the two. In one embodiment, content packagers 114 may package the content into multiple container files, such as multiple transport stream files, and generate additional information enabling distribution systems 120 and/or content output devices 102 to distribute or consume the packaged content. For example, the content packagers 114 may package the encoded content according to streaming protocols, such as Hypertext Transport Protocol ("HTTP") Live Streaming ("HLS") or MPEG Dynamic Adaptive Streaming over HTTP ("MPEG-DASH"), and generate metadata regarding the encoded content, such as manifest file identifying each package of encoded content.

After packaging the encoded content, the content packagers 114, at (13), distribute the content to one or more of the content output devices 102, the content distribution systems 120 (which may in turn distribute the content to content output devices 102 for decoding and output), and the content data store 119 (e.g., for archival purposes, for later transmission to the content distribution systems 120 and/or content output devices 102).

While the interactions of FIGS. 3A and 3B are described above sequentially, it is contemplated that some or all of the interactions may repeatedly occur, and that these interactions may occur at least in part concurrently. For example, content encoder 112A may continue to receive and encode content during interactions (4)-(10). Moreover, while not shown in FIGS. 3A and 3B, encoder 112A may process and output encoded content to the content packagers prior to encoder 112B becoming synchronized. Still further, while FIGS. 3A and 3B are described with respect to two encoders 112, any number of encoders 112 could be utilized, each synchronized to a reference encoder 112. While timestamp synchronization is described above with respect to a frame offset (e.g., a number of frames processed by reference encoder 112 that are not processed by an encoder 112 to be synchronized), other offset types may additionally or alternatively be utilized by an encoder 112. For example, rather than determine a frame offset, an encoder 112 may determine a timestamp offset directly, according to the equation $$\text{timestamp\_offset} = \frac{RefEncFrames}{FPS} * \text{timestamp\_resolution}$$

The encoder 112 to be synchronized may then increment each timestamp value by the timestamp offset, to result in a timestamp expected to match that of the reference encoder 112. However, in some instances, minor differences may exist between the timestamp of the encoder 112 to be synchronized and the reference encoder 112, because the use of division within the equation above may result in "off by one" errors in instances where timestamps are represented as integer values. The use of a frame offset can prevent such errors, and therefore may be preferable.

While the description above generally discusses frames of content, other units may additionally or alternatively be used. For example, where video content is interlaced, the equations above may be calculated with respect to video fields, rather than video frames.

Figure 4:
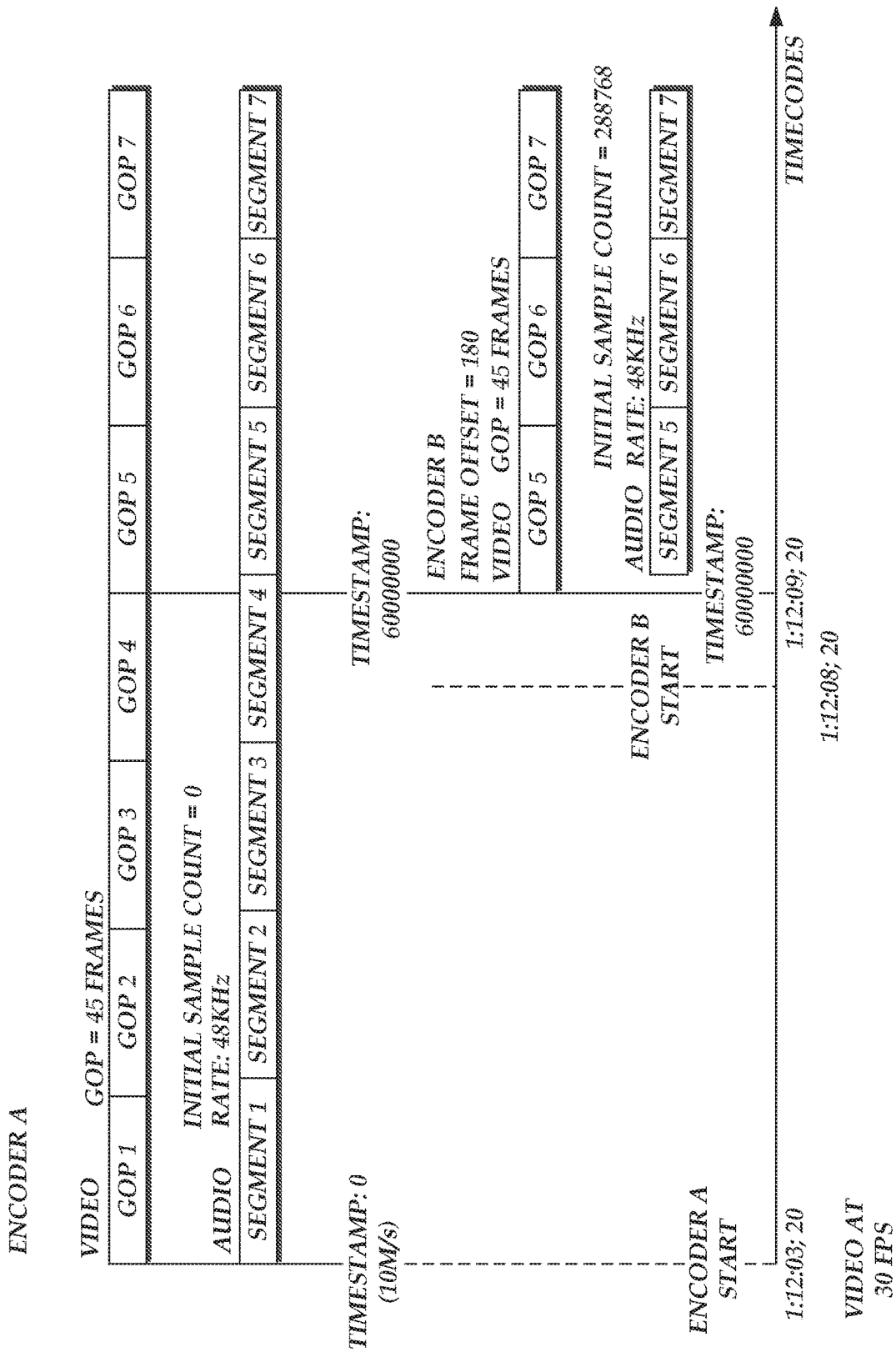
FIG. 4 is an illustrative visualization of content encoded by a first and second encoder in a synchronized state.

With reference to FIG. 4, one illustrative visualization of how outputs of different encoders 112 may be synchronized is shown. As depicted in FIG. 4, a first encoder, "Encoder A") may begin encoding audio and video content at a first point in time, represented as timecode "1:12:03; 20" (1 hour, 12 minutes, 3 seconds, and 20 frames). The initial timestamp of encoder A is set to zero, the initial audio sample count is also zero, and it is encoding at a GOP size of 45 frames. A second encoder, encoder B, begins at timecode "1:12:08; 20," and attempts to synchronize with encoder A. Thus, encoder B retrieves the initial timecode value of "1:12:03; 20" from encoder A via the interactions described above.

Encoder B then utilizes the initial timecode value to determine when the next GOP will begin on encoder A, which in the illustrated instance would occur at timecode "1:12:09; 20" (four GOPs after the encoder A began). To ensure that timestamps are synchronized, encoder B further calculates a frame offset to be used when determining timestamp values. The frame offset indicates the number of frames between the initial timecode at which encoder A began encoding and the timecode at which encoder B will begin encoding. In the example of FIG. 4, that value is 180 frames. Thus, to calculate the timestamp for a given timecode, encoder B sums the frames encoded (0) and the frame offset (180), divides by the frames per second (30), and multiplies by the number timestamps to elapse per second (10 million). The result is that encoder B will begin to encode the frame at timecode 1:12:09; 20 with a timestamp of 60/000,000, identical to that of encoder A.

Encoder B further utilizes the initial timecode value to determine a point at which a next audio segment will begin at encoder A. In the example of FIG. 4, the encoder B is configured to begin each audio segment at the first complete frame after the beginning of a corresponding GOP. Moreover, the content encoded has an audio sample rate of 48 KHz and frames of 1024 samples per frame. Accordingly, the encoder B can determine that, if an audio frame began at timecode 1:12:03; 20 (when encoder A began encoding), after six seconds (at a timecode of 1:12:09; 20), 281.25 audio frames have been output by encoder A. Thus, the encoder B can wait 0.75 audio frames (768 samples, or 0.016 seconds) to begin an audio segment (to ensure that the segment begins at the first complete frame following the start of GOP 5). In addition, encoder B can further calculate an initial audio sample count. This sample count indicates a number of audio samples previously output by the encoder A, and can be used for a basis of an incremental sample count by encoder B (e.g., increasing as audio samples are output). Based on the calculations above, encoder B is expected to begin encoding an audio segment at 282 frames after encoder A, equivalent to 288768 samples. Thus, encoder B sets its initial sample count value at 288768. In some instances, encoder B may be configured to begin encoding audio immediately (e.g., at timecode 1:12:08; 20), or at some other point prior to the beginning of the next complete audio segment. As this may result in an incomplete or shorter than expected audio segment, encoder B may be configured to discard the segment where a downstream component (e.g., a packager) depends on receiving complete segments of an expected size.

Figure 5:
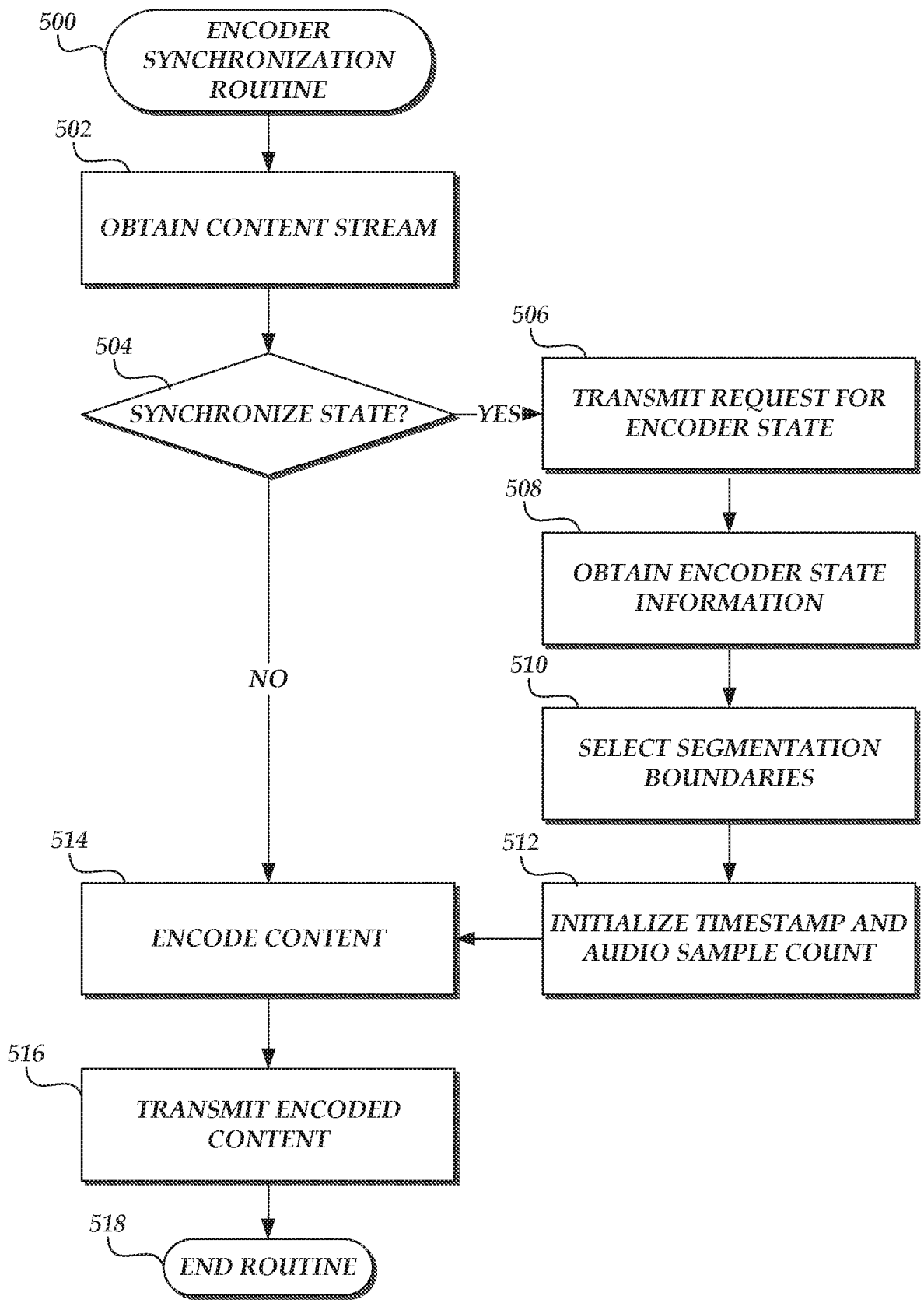
FIG. 5 is a flow chart depicting an illustrative routine for encoding content utilizing an encoding state synchronized to other content encoders.

With reference to FIG. 5, one illustrative routine 500 that may be implemented by a first encoder 112 to encode content synchronously with a second encoder 112 is depicted. The routine 500 begins at block 502, where the first encoder 112 obtains a content stream (e.g., as a live stream provided by a content provider 104). At 504, the first encoder 112 determines whether encoding should be synchronized with another encoder. Illustratively, the first encoder 112 may be instructed, as part of its startup instructions, as to whether or not to synchronize state with another encoder 112. If no synchronization is required (e.g., if the first encoder 112 is the initial encoder 112 for the content stream), the routine 500 proceeds to block 514, where the first encoder 112 encodes the content (e.g., converting the content into a digital format readable by output devices 102), and then to block 516, where the first encoder 112 transmits the content to a receiving device (e.g., a packager 114).

If synchronization is required at block 504, the routine 500 proceeds to block 506, where the first encoder 112 transmits a request to a second encoder 112 (e.g., the encoder 112 to be synchronized to) for state information. In response to the request, the first encoder 112 obtains the state information at block 508. As noted above, the state information can include (and in some instances may include only) a timecode at which the second encoder 112 began to encode the content stream. The state information may also include other information regarding a state of the second encoder 112, such as configuration parameters of the reference encoder 112.

Thereafter, at block 510, the first encoder 112 selects segmentation boundaries that are calculated to align with those used by the second encoder 112. Specifically, as described above, the first encoder 112 can utilize knowledge of the initial timecode at which the second encoder 112 began encoding, along with configuration parameters of the second encoder 112 (e.g., GOP size), to determine a next timecode at which a GOP will begin at the second encoder 112. The first encoder 112 can then begin encoding a GOP at the same timecode. Similarly, the first encoder 112 can utilize the knowledge of the initial timecode at which the second encoder 112 began encoding, along with configuration parameters of the second encoder 112 (e.g., audio sample rate, frame size, segment generation mechanism) to determine a next time (e.g., timestamp) at which the second encoder 112 will begin encoding an audio segment. The first encoder 112 can thereafter begin encoding an audio segment at that same time.

In addition, at block 512, the first encoder 112 can synchronize timestamp values with the second encoder 112. Specifically, as described above, the first encoder 112 can determine a number of frames that have elapsed since the second encoder 112 began encoding, and append that number of frames to each timestamp calculation. For example, if 90 frames have elapsed since the second encoder 112 began encoding, each frame encoded by the first encoder 112 may have a timestamp calculated as if it were the (90+n)th frame to be encoded, rather than the nth frame. Additionally, the first encoder 112 can synchronize an audio sample count value with the second encoder 112, by determining a number of audio frames output by the second encoder 112 prior to the first audio segment output by the first encoder 112, and setting the audio sample count value equal to that number of audio frames, multiplied by the number of samples per frame. Thus, both timestamp values and audio sample count values for the first encoder 112 will match those of the second encoder 112.

After synchronizing segmentation boundaries, timestamp, and audio sample count values, the routine 500 continues to block 514, where the first encoder 112 encodes content. Because the first encoder 112 has been synchronized to the second encoder 112, the content output by each encoder 112 is expected to be interchangeable, and can thus provide resiliency, redundancy, or adaptability to subsequent packagers or output devices.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for synchronized encoding of video content, the system comprising:
a first encoder comprising one or more processors configured to:
obtain, from a content source, a content stream to be encoded, wherein parts of the content stream are identified by timecodes inserted into the content stream by the content source, the timecodes indicating a relative position of the parts within the content stream;
encode the content stream to generate first encoded content, wherein encoding the content stream comprises encoding timestamp values within the content stream, the timestamp values indicating at least one of a timing of presentation or a timing of decoding of the first encoded content; and
output the first encoded content; and a second encoder comprising one or more processors configured to:
obtain the content stream to be encoded, including the timecodes inserted into the content stream by the content source;
transmit a request to the first encoder to obtain a first timecode value of the content stream, wherein the first timecode value references a timecode, in the content stream, indicating a part of the content stream at which the first encoder began to encode the content stream, and wherein the one or more processors of the first encoder are further configured to return the first timecode value in response to the request;
obtain the first timecode value;
determine, based at least in part on the first timecode value, a second timecode value indicating a point within the content stream at which the second encoder will begin encoding;
determine a timestamp offset value for the second encoder based at least in part on a difference in the first timecode value indicating the point within the content stream at which the first encoder began to encode the content stream and the second timecode value indicating the point in time within the content stream at which the second encoder will begin encoding;
encode the content stream to generate second encoded content, wherein encoding the content stream comprises encoding modified timestamp values within the second encoded content, and wherein the modified timestamp values are modified from default timestamp values by incrementing the default timestamp values according to the timestamp offset value such that the modified timestamp values match the timestamp values encoded within the first encoded content; and
output the second encoded content.

2. The system of claim 1, wherein the content is live streaming content.

3. The system of claim 1, wherein the first and second encoders each include an interface through which to receive the content, and wherein the interface is at least one of an serial digital interface (SDI) or a network interface.

4. The system of claim 1, wherein the timestamp offset value indicates at least one of a number of frames of the content or a number of fields of content between the first timecode value and the second timecode value.

5. The system of claim 1, wherein the timestamp offset value indicates a timestamp of the first encoded content of a part within the content indicated by the second timecode value.

6. A computer-implemented method for synchronized encoding of content, the computer-implemented method comprising:
obtaining, at a first encoder, a content stream, wherein locations within the content stream are identified by timecodes inserted into the content stream by a content source, the timecodes indicating a relative position of content within the content stream;
obtaining, at the first encoder, an identifier of a second encoder to which to synchronize encoding;
transmitting, from the first encoder, a request to obtain a first timecode value of the content stream, the first timecode value identifying a location within the content stream at which the second encoder began to encode the content stream;
obtaining, at the first encoder, the first timecode value from the second encoder;
determining, at the first encoder and based at least in part on the first timecode value, a second timecode value identifying a location within the content stream at which the first encoder will begin encoding the content stream;
determining, at the first encoder, a timestamp offset value representing at least a difference in the first timecode value identifying the location within the content stream at which the second encoder began to encode the content stream and the second timecode value identifying the location within the content stream at which the first encoder will begin encoding the content stream;
encoding, at the first encoder, the content stream to generate encoded content, wherein encoding the content stream comprises associating modified timestamp values with portions of the encoded content, and wherein the modified timestamp values are modified from default timestamp values by incrementing the default timestamp values according to the timestamp offset value; and
outputting the encoded content from the first encoder.

7. The computer-implemented method of claim 6, wherein the content is at least one of audio or video content.

8. The computer-implemented method of claim 6, wherein determining, based at least in part on the first timecode value, the second timecode value indicating the location within the content stream at which the first encoder will begin encoding the content stream comprises:
determining a segmentation size for the encoded content;
determining, from the first timecode value and the segmentation size, a next timecode value at which the second encoder will encode a segment of the content stream; and
setting the next timecode value as the second timecode value.

9. The computer-implemented method of claim 6, wherein the content stream comprises audio and video content, wherein the second timecode value indicates the location within the content stream at which the first encoder will begin encoding the video content, and wherein the computer-implemented method further comprises:
determining a location within the content stream at which the first encoder will begin encoding audio;
identifying an audio sample rate of the content stream;
determining, based at least in part on the audio sample rate, a number of audio samples included within a portion of the between the first timecode value and the location within the content stream at which the first encoder will begin encoding audio; and
establishing an audio sample count within the encoded content from at least the number of audio samples.

10. The computer-implemented method of claim 6, wherein the encoded content is encoded according to at least one of H.263, H.264, H.265, APPLE Intermediate Codec, ProRes, VP3 through 9, MPEG-2 part 2, RealVideo, Dirac, Theora, and MPEG-4 Part 2, VC-1, Vorbis, Opus, MP3, advanced audio coding ("AAC"), pulse-code modulation ("PCM"), dedicated to sound ("DTS"), MPEG-1, audio coding 3 ("AC-3"), free lossless audio codec ("FLAC"), or RealAudio formats.

11. The computer-implemented method of claim 6, wherein outputting the encoded content from the first encoder comprises outputting the encoded content to a packager comprising one or more processors configured with computer-executable instructions to package the encoded content into a container.

12. The computer-implemented method of claim 11, wherein the container corresponds to at least one of a Matroska, FLV, MPEG-4 Part 12, VOB, Ogg, Audio Video Interleave ("AVI"), Quicktime, Advanced Systems Format ("ASF"), MPEG-Transport Stream ("MPEG-TS"), or RealMedia container.

13. The computer-implemented method of claim 11, wherein the container corresponds to a plurality of containers generated in accordance with at least one of the Hypertext Transport Protocol ("HTTP") Live Streaming ("HLS") protocol or MPEG Dynamic Adaptive Streaming over HTTP ("MPEG-DASH") protocol.

14. The computer-implemented method of claim 6, wherein encoding, at the first encoder, the content stream to generate the encoded content comprises encoding the content according to a set of parameters also used by the second encoder to encode the content stream.

15. The computer-implemented method of claim 6, wherein encoding, at the first encoder, the content stream to generate the encoded content comprises encoding the content according to a set of parameters interchangeable with a set of parameters used by the second encoder to encode the content stream.

16. The computer-implemented method of claim 15, wherein the set of parameters used by the first encoder and the set of parameters used by the second encoder differ according to at least one of resolution, bitrate, or framerate.

17. Non-transitory computer-readable storage media including computer executable instructions that, when executed by an encoding system comprising one or more processors, cause the encoding system to:
obtain a content stream, wherein locations within the content stream are identified by timecodes inserted into the content stream by a content source, the timecodes indicating a relative position of content within the content stream;
obtain a first timecode value indicating a reference location within the content stream;
determine a second timecode value indicating a location within the content stream at which the encoding system will begin encoding;
determine a timestamp offset value representing at least a difference in the first timecode value indicating the reference location within the content stream and the second timecode value indicating the location within the content stream at which the encoding system will begin encoding;
encode the content stream to generate encoded content, wherein encoding the content stream comprises associating modified timestamp values with portions of the encoded content, and wherein the modified timestamp values are modified from default timestamp values by adjusting the default timestamp values according to the timestamp offset value; and
output the encoded content.

18. The non-transitory computer-readable media of claim 17, wherein the computer executable instructions cause the encoding system to determine the second timecode value at least partly by:
determining a segmentation size for the encoded content;
determining, from the first timecode value and the segmentation size, a next timecode value at which the reference encoding system will encode a segment of the content stream; and
setting the next timecode value as the second timecode value.

19. The non-transitory computer-readable media of claim 17, wherein the content stream comprises audio and video content, wherein the second timecode value indicates the location within the content stream at which a first encoder will begin encoding the video content, and wherein the computer executable instructions cause the encoding system to:
determine a location within the content stream at which the encoding system will begin encoding audio;
identify an audio sample rate of the content stream;
determine, based at least in part on the audio sample rate, a number of audio samples included within a portion of the between the first timecode value and the location within the content stream at which the encoding system will begin encoding audio; and
establish an audio sample count within the encoded content from at least the number of audio samples.

20. The non-transitory computer-readable media of claim 17, wherein the computer executable instructions cause the encoding system to encode the content stream according to a set of parameters interchangeable with a set of parameters used by the reference encoding system to encode the content stream.

* * * * *